United States Patent
Todeschini

(10) Patent No.: US 9,251,411 B2
(45) Date of Patent: Feb. 2, 2016

(54) AUGMENTED-REALITY SIGNATURE CAPTURE

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/035,474

(22) Filed: Sep. 24, 2013

(65) Prior Publication Data

US 2015/0086114 A1  Mar. 26, 2015

(51) Int. Cl.
*G06K 9/00* (2006.01)

(52) U.S. Cl.
CPC ............. *G06K 9/00402* (2013.01); *G06K 9/00* (2013.01); *G06K 9/00221* (2013.01)

(58) Field of Classification Search
CPC . G06K 17/0022; G06K 9/00355; G06K 9/00; G06K 9/6255; G06K 9/00442; G06K 7/1098; G06K 17/30876; G06K 9/00154; G07C 9/0015; G07C 9/00158; G06F 17/30876; G06Q 20/40145; G07F 7/10
USPC .......... 382/118, 123, 155, 188; 235/440, 472, 235/469, 435, 383, 380
See application file for complete search history.

(56) References Cited

U.S. PATENT DOCUMENTS

| | | | |
|---|---|---|---|
| 4,028,674 A * | 6/1977 | Chuang | G06K 9/00154 382/123 |
| 4,454,610 A * | 6/1984 | Sziklai | G07C 9/00063 235/380 |
| 5,251,265 A * | 10/1993 | Dohle | G07C 9/0015 382/123 |
| 5,432,864 A * | 7/1995 | Lu | G06K 9/00275 340/5.83 |
| 5,717,512 A * | 2/1998 | Chmielewski, Jr. | G02B 26/0816 348/E13.005 |
| 5,892,824 A * | 4/1999 | Beatson | G06K 9/00154 380/52 |
| 6,404,925 B1 * | 6/2002 | Foote | G06F 17/30746 348/480 |
| 6,714,665 B1 * | 3/2004 | Hanna | G06K 9/00 382/106 |
| 6,832,725 B2 | 12/2004 | Gardiner et al. | |
| 6,836,555 B2 * | 12/2004 | Ericson | G06K 9/00154 382/116 |
| 6,873,715 B2 * | 3/2005 | Kuo | G07C 9/00047 235/380 |
| 6,935,566 B1 * | 8/2005 | Mulla | H04L 61/30 235/462.45 |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |

(Continued)

FOREIGN PATENT DOCUMENTS

| JP | 2005275599 A | 10/2005 |
|---|---|---|
| JP | 2012220974 A | 11/2012 |

(Continued)

OTHER PUBLICATIONS

U.S. Appl. No. 13/367,978, filed Feb. 7, 2012, (Feng et al.).

(Continued)

*Primary Examiner* — Vu Le
*Assistant Examiner* — Aklilu Woldemariam
(74) *Attorney, Agent, or Firm* — Additon, Higgins & Pendleton, P.A.

(57) ABSTRACT

A method for acquiring a person's signature includes handwriting a signature by projecting movements of light. Signature information with respect to the projected light movements is concurrently acquired. The signature information is compiled to create a signature image.

29 Claims, 2 Drawing Sheets

(56) References Cited

U.S. PATENT DOCUMENTS

| | | | |
|---|---|---|---|
| 7,729,520 B2 * | 6/2010 | Kempf | G06K 9/00154 178/19.01 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 2002/0158848 A1 | 10/2002 | Sekendur | |
| 2003/0001818 A1 * | 1/2003 | Katagiri | G06F 3/0304 345/158 |
| 2003/0142855 A1 * | 7/2003 | Kuo | G07C 9/00047 382/119 |
| 2004/0032975 A1 * | 2/2004 | Boccacci | G07C 9/00079 382/115 |
| 2004/0066371 A1 * | 4/2004 | Huang | G06F 3/03545 345/163 |
| 2007/0063048 A1 | 3/2007 | Havens et al. | |
| 2008/0185432 A1 | 8/2008 | Caballero et al. | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0138685 A1 | 6/2012 | Qu et al. | |
| 2012/0168511 A1 | 7/2012 | Kotlarsky et al. | |
| 2012/0168512 A1 | 7/2012 | Kotlarsky et al. | |
| 2012/0193407 A1 | 8/2012 | Barten | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2013/0043312 A1 | 2/2013 | Van Horn | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0082104 A1 | 4/2013 | Kearney et al. | |
| 2013/0175341 A1 | 7/2013 | Kearney et al. | |
| 2013/0175343 A1 | 7/2013 | Good | |
| 2013/0200158 A1 | 8/2013 | Feng et al. | |
| 2013/0214048 A1 | 8/2013 | Wilz | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292474 A1 | 11/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306730 A1 | 11/2013 | Brady et al. | |
| 2013/0306731 A1 | 11/2013 | Pedraro | |
| 2013/0306734 A1 | 11/2013 | Xian et al. | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0313326 A1 | 11/2013 | Ehrhart | |
| 2013/0327834 A1 | 12/2013 | Hennick et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |

(56) References Cited

U.S. PATENT DOCUMENTS

| | | |
|---|---|---|
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |
| 2014/0270352 A1 | 9/2014 | Fujimura |

FOREIGN PATENT DOCUMENTS

| | | |
|---|---|---|
| WO | 2005066747 A2 | 7/2005 |
| WO | 2008080672 A1 | 7/2008 |
| WO | 2009091288 A1 | 7/2009 |
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.

(56) References Cited

OTHER PUBLICATIONS

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

Mario E. Munich and Pietro Perona, "Camera-based ID Verification by Signature Tracking," Published in ECCV 1998 Proceedings of the 5th European Conference on Computer Vision—vol. 1, 15 pages.

Sanghi et al., "A Fingertip Detection and Tracking System as a Virtual Mouse, a Signature Input Device and an Application Selector", Proceedins of the 7th International Caribbean Conference on Devices, Circuits and Systesm, Mexico, Apr. 28-30, 2008, 4 pages.

Combined Search and Examination Report in related Great Britain Application No. GB1416263.0, Dated Mar. 9, 2015, 5 Pages.

\* cited by examiner

AUGMENTED-REALITY SIGNATURE CAPTURE

FIELD OF THE INVENTION

The present invention relates to electronic signatures. More particularly, the present invention relates to a method of acquiring a person's signature using an imaging device.

BACKGROUND

Certain business transactions generally require one party to obtain another party's signature. Courier services that transport documents and packages, for example, often require the recipient to acknowledge receipt of the delivery by providing a signature. Before the widespread use of mobile computer devices, delivery personnel would generally carry a clipboard with a signature sheet that they would present to the recipient after making the delivery. The recipient would sign the signature sheet with a pen or pencil to create a written verification that the delivery had transpired.

The advent of relatively inexpensive mobile computing devices has led to their adoption by many courier services that now use these devices to electronically capture the signature of a package recipient. The display screen of the mobile computing device is often a touchscreen, which allows for the recipient to record his or signature by moving a stylus or finger over the touchscreen so that the signature can be electronically captured and stored by the mobile computing device. While this approach simplifies the storage of the signature and provides for virtually instantaneous access to the signature when the mobile device is connected to a network such as the Internet, it requires that the mobile computing device be equipped with a touchscreen or similar display device suitable for accepting a signature.

Some mobile computing devices either do not have touchscreens or are so miniaturized that signing the touchscreen is impractical or impossible. Mobile computing devices that a user can wear such as head-mounted displays (HMD) or a wristwatch smartphones, for example, are generally not suitable for receiving a signature using the aforementioned method.

Therefore, a need exists for a method of capturing a person's signature using a mobile computing device (e.g., image-processing device) that does not require a touchscreen or touchpad input device.

SUMMARY

Accordingly, in one aspect, the present invention embraces a method for acquiring a person's signature. The signature is handwritten by projecting movements of light while concurrently acquiring signature information with respect to the projected light movements. The signature information is compiled into a signature image (e.g., compiled signature image).

In one embodiment, the step of acquiring signature information with respect to the projected light movements includes capturing positional information of the projected light movements.

In another embodiment, signature information is acquired by (i) capturing signature-information images of the projected light movements, and (ii) compiling the signature-information images into a signature image.

In yet another embodiment, signature information is acquired by capturing substantially all of the projected light movements in an overexposed signature-information image.

In yet another embodiment, the signature information is concurrently analyzed as it is being acquired.

In yet another embodiment, the signature information is concurrently displayed as it is compiled into a signature image.

In yet another embodiment, the method includes displaying the compiled signature image.

In yet another embodiment, the compiled signature image is recorded.

In yet another embodiment, an image of the signing person's face is acquired.

In another aspect, the present invention embraces a method for capturing signature information. An image processing device is provided that includes (i) a camera for capturing signature information within the camera's field of view, (ii) a display for displaying signature information captured by the camera, and (iii) a computer processor communicatively connected to the camera and the display. A signature is handwritten by projecting light onto a surface using a light-emitting device. As the signature is handwritten on the surface, signature information with respect to the projected light is concurrently captured using the image-processing device's camera. The signature information is processed to compile a signature image using the image-processing device's processor. The compiled signature image is displayed using the image-processing device's display.

In another aspect, the present invention embraces a method for capturing signature information where an image-processing device is provided that includes (i) a camera for capturing signature information within the camera's field of view, (ii) a display for displaying signature information captured by the camera, and (iii) a computer processor communicatively connected to the camera and the display. A signature is handwritten by projecting light at the image-processing device's camera using a light-emitting device. Signature information with respect to the projected light is concurrently captured using the image-processing device's camera. The signature information is processed to compile a signature image using the image-processing device's processor. The compiled signature image is displayed using the image-processing device's display.

In one embodiment, capturing signature information with respect to the projected light includes capturing positional information of the projected light using the image-processing device's camera.

In another embodiment, capturing signature information with respect to the projected light includes capturing signature-information images of the projected light using the image-processing device's camera.

In yet another embodiment, the signature information is concurrently displayed using the image-processing device's display while the signature information is being captured.

In yet another embodiment, the computer processor includes an associated memory for storing the signature information and/or the compiled signature image.

In another aspect, the present invention embraces a method for acquiring a person's signature where a signature is handwritten by finger movements in the air. Signature information with respect to the finger movements is concurrently acquired. The signature information is compiled into a signature image.

In one embodiment, acquiring signature information with respect to the finger movements includes capturing positional information images of the finger movements In another embodiment, acquiring signature information with respect to the finger movements includes capturing signature-information images of the finger movements.

In yet another embodiment, the signature information is concurrently analyzed as the signature information is acquired.

In yet another embodiment, the signature information is concurrently displayed as the signature information is compiled into a signature image.

In yet another embodiment, the compiled signature image is displayed.

In yet another embodiment, the compiled signature image is recorded.

In yet another embodiment, an image of the signing person's face is acquired.

In another aspect, the present invention embraces a method for capturing signature information where an image-processing device is provided that includes (i) a camera for capturing signature information within the camera's field of view, (ii) a display for displaying signature information captured by the camera, and (iii) a computer processor communicatively connected to the camera and the display. A signature is handwritten in the air using a signature motion within the field of view of the image-processing device's camera. As the signature is handwritten in the air, signature information is concurrently captured using the image-processing device's camera. The signature information is processed to compile a signature image using the image-processing device's processor. The compiled signature image is displayed using the image-processing device's display.

In one embodiment, capturing signature information includes capturing hand-positioning information using the image-processing device's camera.

In another embodiment, capturing signature information includes capturing signature-information images using the image-processing device's camera.

In yet another embodiment, the computer processor includes an associated memory for storing the signature information and/or the compiled signature image.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a method for acquiring a person's signature. Instead of relying on tactile interaction (e.g., between a stylus and a touchscreen), the method according to the present invention utilizes image processing and augmented reality to plot a signing person's movements and interpret and display the signature in real time.

Figure 1:
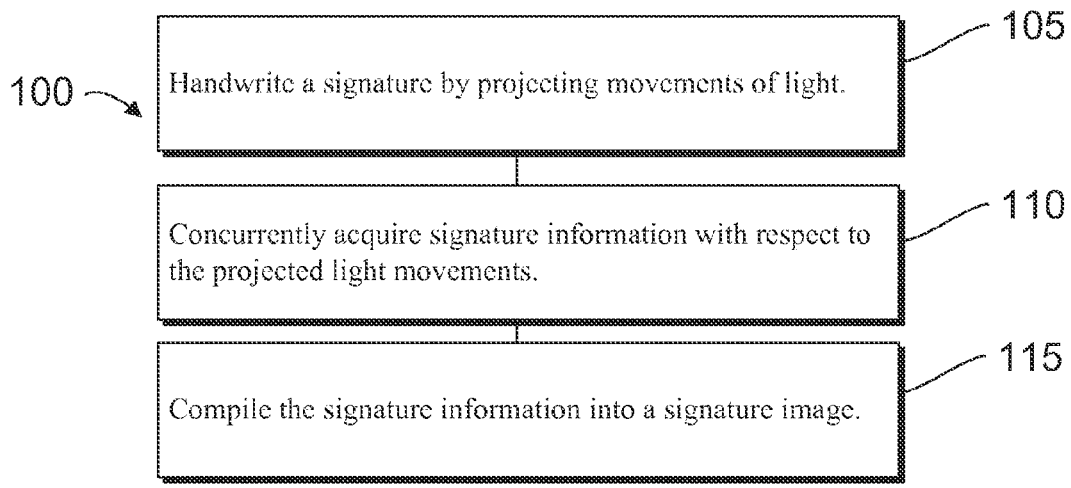
FIG. 1 is a block diagram depicting an exemplary method according to the present invention wherein a signature is handwritten by projecting movements of light.

Referring now to FIG. 1, the method 100 according to the present invention is illustrated in a block diagram. When obtaining a person's signature is required, the person (i.e., signing person) mimics the same motion that the signing person would use to sign his or her name on paper (e.g., the signing person's signature motion). Rather than writing down the signature on paper or on the surface of a computer display, the signing person executes the signature motion in free space (e.g., in the air). The signing person uses a light-emitting device (e.g., light source, laser source, LED source) while making the signature motion 105. Typically, the signing person holds in his or her hand the light-emitting device, which may be pen-shaped with a light source at one end. In general, the signing person holds the light-emitting device in the same manner as he or she would hold a traditional writing utensil such as a pencil or pen. Alternatively, the light-emitting device may be removably attached to the signing person's hand. For example, the light-emitting device may be strapped or otherwise fastened around the signing person's finger(s), hand, or wrist (e.g., by a hook-and-loop strap, by a glove attached to the light-emitting device, etc.). With the signing person equipped with a light-emitting device in this way, as the signing person executes the signature motion, the light from the light-emitting source follows the path of the signature motion.

An image-processing device (e.g., mobile computing device, smartphone, handheld computer, tablet computer, laptop computer, wearable computing device, head-mounted display (HMD)), smartwatch, etc.) is used to capture information (e.g., signature information) about the signature motion based upon the image-processing device's detection of the movement of the light from the light-emitting source 110. Typically, the image-processing device includes a camera having an image sensor (e.g., CMOS sensor, CCD image sensor) for generating a digital image from light gathered through the camera's lens assembly. The digital image generated by the camera is comprised of pixels. Because the digital image is a two-dimensional array, each pixel has two coordinates, an x position and a y position.

When acquiring a person's signature, the image-processing device is positioned such that the light from the light-emitting device is within the camera's field of view. For example, the signing person may use a laser pen to project a laser light onto a surface (e.g., a sheet of paper, a table, a wall). In that instance, the image-processing device is positioned so that the portion of the surface on which the signing person is projecting the laser light is within the camera's field of view such that the image-processing device can receive (e.g., via the camera's image sensor) the laser light reflected off of the surface as the signing person executes the signature motion. Image-processing devices such as smartphones are compact and easily maneuverable such that they can readily be repositioned to bring the desired portion of the surface within the field of view of the image-processing device's camera. Alternatively, the signing person can ensure that he or she projects the light onto a surface that is within the camera's field of view (e.g., reposition the light-emitting device). If the surface is movable (e.g., a sheet of paper), this may include repositioning the surface itself into the camera's field of view.

As a consequence of employing a light-emitting device to execute the signature motion, a portion of each image frame received by the image sensor depicts the light from the light-emitting source. This is the case regardless of whether the light is projected onto a surface and reflected toward the camera, or is projected directly at the camera as discussed below. The image-processing device processes each image frame to determine which portion of the frame (e.g., which pixel(s) in the frame) represents the light from the light-emitting device.

Typically, the image-processing device determines (e.g., acquires) signature information by analyzing the intensity of each of the pixels within the each image frame acquired by the camera during the signature motion sequence. The light projected from the light-emitting device will generally be the brightest light within the image-processing device's field of view. Consequently, the image-processing device will typically locate the pixel(s) with the highest intensity. For example, the image-processing device could be configured (e.g., programmed) to treat any pixel with a greyscale value greater than 250 as signature information (e.g., as light projected from the light-emitting device). A person of ordinary skill in the art will appreciate that there are other methods of identifying the pixels within an image frame that represent the light from the light-emitting source. By way of further example, the image-processing device can acquire signature information by identifying pixels associated with the color of the light projected from the light-emitting device (e.g., a particular RGB triplet or hex triplet). In this way, when a red laser light is project onto, for example, a white background (e.g., a white sheet of paper), the image-processing device can acquire the signature information in each frame by determining which pixels in the image frame are red (or nearly red).

Having determined which portion (e.g., which pixel(s)) in a given image frame represent signature information, the image-processing device compiles the signature information from each image frame to form a complete representation of the signing person's signature (e.g., a signature image) 115. To facilitate faster compilation of the signature image, the image-processing device stores the signature information from each image as positional information (e.g., x, y coordinates) representing the location in each image frame of the pixel(s) that depict the light projected from the light-emitting device. A person of ordinary skill in the art will appreciate that storing the positional information of a pixel (and thereby the positional information of the projected light movements with respect to the image-processing device's field of view) requires the storage of only two integers, which requires much less processing time and storage capacity than storing entire image files.

In an alterative embodiment, signature information is acquired by capturing signature-information images at selected time intervals. Each signature-information image captures all of the information in the camera's field of view, including signature information, at a given point in time during the signature motion sequence. The image-processing device compiles all of the captured signature-information images into a compiled image that shows the position of the light-emitting device at each point in time during the sequence of executing the signature motion. For example, the image-processing device may isolate the pixels representing the light-emitting device in each signature-information image, copy those pixels, then superimpose those pixels on the background of the signature-information image (or on an alternate background (e.g., a blank background)) to form a compiled image that shows the position of the light-emitting device at substantially every interval of time in the signature motion sequence, there creating a compiled image depicting a substantially complete handwritten signature.

Alternatively, signature information is acquired by capturing substantially all of the projected light movements in an overexposed signature-information image. Employing this approach, the camera's image sensor is exposed to light (e.g., senses the light passing through the lens assembly) for the entire duration of the signature sequence, including the light from the light-emitting device (reflected light or direct light). To distinguish the light from the light-emitting device from the ambient light (e.g., background light), light below a certain threshold is filtered out, leaving substantially just the light from the light-emitting device. The resulting image shows the handwritten signature as a light trail. Alternatively, the filter could filter out the light from the light-emitting device, thereby resulting in an overexposed image showing the handwritten signature as an inverse light trail (or trail of darkness). To reduce the chance of a completely overexposed image during the daytime, an infrared filter (IR filter) is used to filter out substantially all light except for the light matching the wavelength of the light from the light-emitting device.

In one embodiment, each image frame is processed in real time (e.g., concurrently with the signature movement) such that the signature image can be generated in real time. In other words, the acquisition of signature information and the compilation of that information into a signature image occur in parallel.

The signature image may be displayed on the image-processing device's display (i.e., display screen) (e.g., tablet computer display screen). Where the signature image is generated concurrently with the execution of the signature motion, the signature image may be displayed on the image-processing device's display in real time. In other words, as the signing person handwrites his or her signature using the light-emitting device, the image-processing device displays in real time the signature image as it is being compiled (e.g., as each new piece of positional information is added). In this way, as the signing person is handwriting his or her name, the display screen displays the signature (in the form of a signature image) as though it were being written on the display screen. The signature image can alternatively be displayed with a projection device (e.g., a handheld projector or pico projector) so that the signature image can be viewed more easily by more than one person. For example, a delivery person could utilize a pico projector to project the signature image onto a nearby surface (e.g., wall, floor, table) for viewing, in real time, the creation of the signature image by the delivery person and the signing person. In this way, the signing person can receive real-time visual feedback to assist the signing person in creating a suitable (e.g., legible) signature image. In an alternative embodiment, the signature image is transmitted by the image-processing device to another device for display and/or storage of the signature image. The image-processing device may transmit the signature image over a computer network (e.g., Internet, LAN, PAN, WAN) using wired or wireless (e.g., wi-fi, Bluetooth, etc.) communication links.

In an alternative embodiment, in addition to generating a signature image, the image-processing device captures an image of the signing person's face. The image of the signing person's may be stored in association with the signing person's signature image to provide additional verification that the signature image is, in fact, the signature of the signing person.

Figure 2:
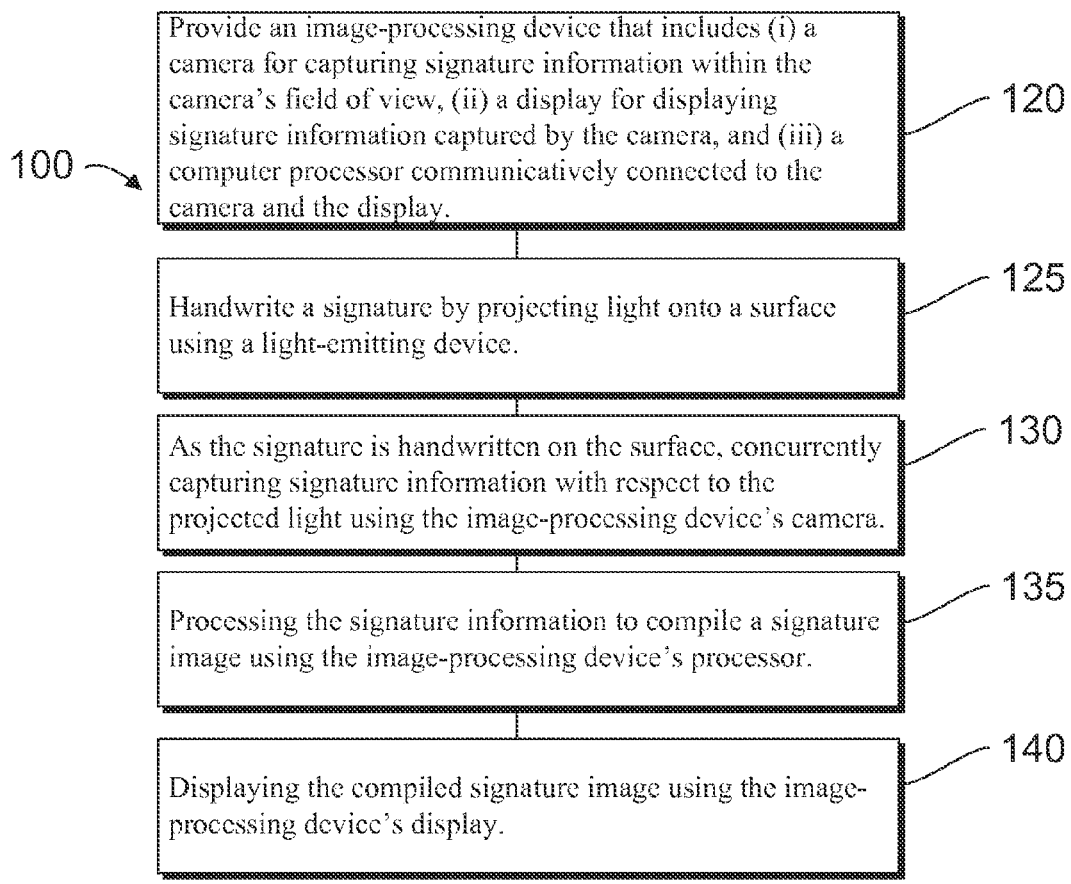
FIG. 2 is a block diagram depicting an exemplary method according to the present invention wherein a signature is handwritten by projecting light onto a surface using a light-emitting device.

Reference is now made to FIG. 2. In an alternative embodiment, the method for capturing signature information according to the present invention includes providing an image-processing device. The image-processing device includes a camera for capturing signature information within the camera's field of view. Typically, the camera includes an image sensor (e.g., CMOS sensor) and a lens assembly. The image-processing device also includes a display for displaying signature information captured by the camera. Typically, the display is integral with the camera, but the display may be a separate module communicatively connected to the camera (e.g., by USB, wi-fi, or Bluetooth connections). The image-processing device also includes a computer processor (e.g., micro-processor). The computer processor is communicatively connected (e.g., via a serial bus) to the camera and display 120. Typically, the computer processor includes an associated memory for storing signature information and/or the signature image.

The signing person handwrites a signature by projecting light onto a surface using a light-emitting device 125. In general, the surface should be suitable for reflecting at least a portion of the projected light and for permitting the reflected light from being distinguishable from the surrounding portions of the surface. Examples of suitable surfaces are walls, floors, ceilings, sheets of paper, the palm of a hand, etc.

As the signature is handwritten on the surface, the camera concurrently captures signature information with respect to the projected light 130. During the capture process, a portion of each image frame captured by the camera represents signature information in the form of the projected light reflected from the surface. Using the computer processor, the image-processing device processes the signature information to compile a signature image, which is an electronic representation of the handwritten signature 135. The signature image is displayed on the image-processing device's display 140.

Figure 3:
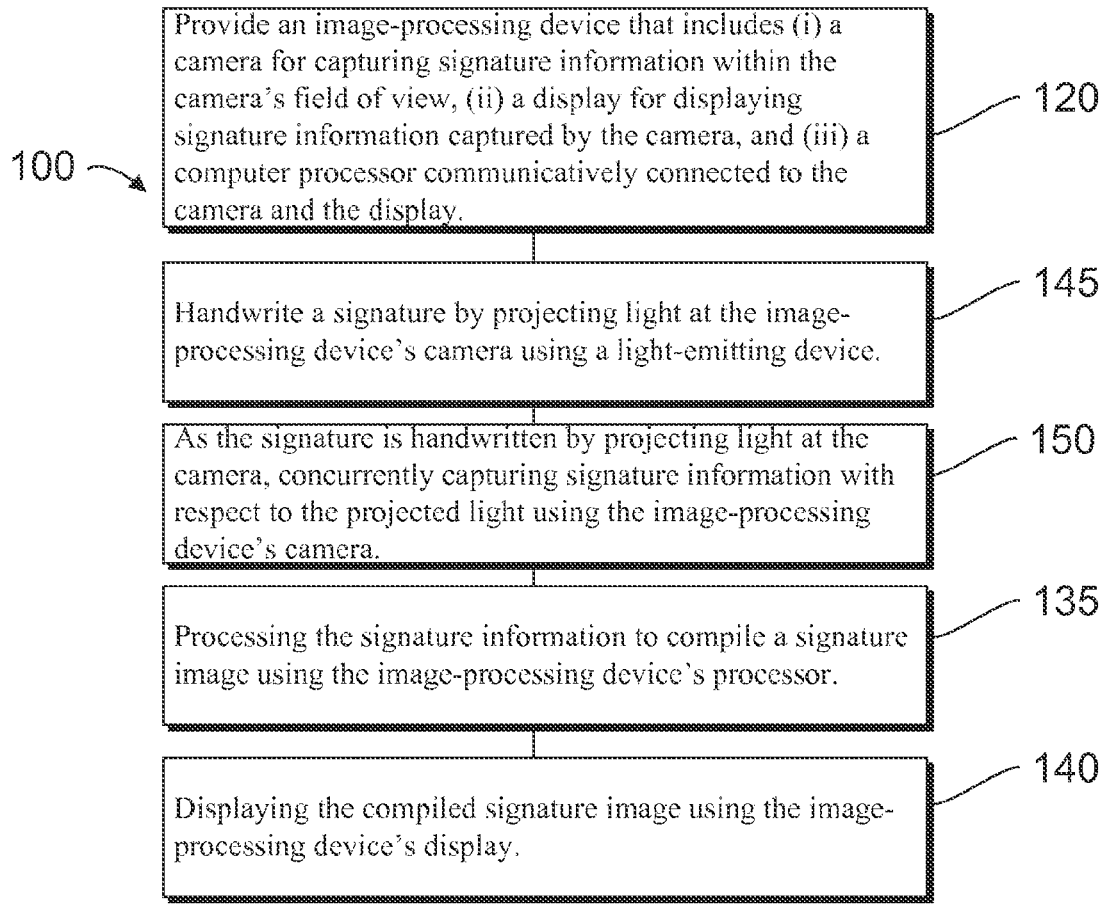
FIG. 3 is a block diagram depicting an exemplary method according to the present invention wherein a signature is handwritten by projecting light at an image-processing device's camera using a light-emitting device.

Referring now to FIG. 3, in an alternative embodiment of the method according to the present invention, an image-processing device is provided that includes a camera, a display, and a computer processor communicatively connected to the camera and the display 120. In this embodiment, rather than projecting light onto a surface, the signing person handwrites the signature by projecting light directly at the image-processing device's camera using a light-emitting device (e.g., a stylus with an LED light at one end, an LED pen light, etc.) 145. An advantage of this approach is that it does not depend upon the availability of a suitable surface.

As the signing person is engaging in the signature motion and projecting the light from the light-emitting device toward the camera and within the camera's field of view, the camera concurrently captures signature information with respect to the projected light 150. The image-processing device's computer processor processes the signature information to compile a signature image 135, which is displayed on the image-processing device's display 140.

Figure 4:
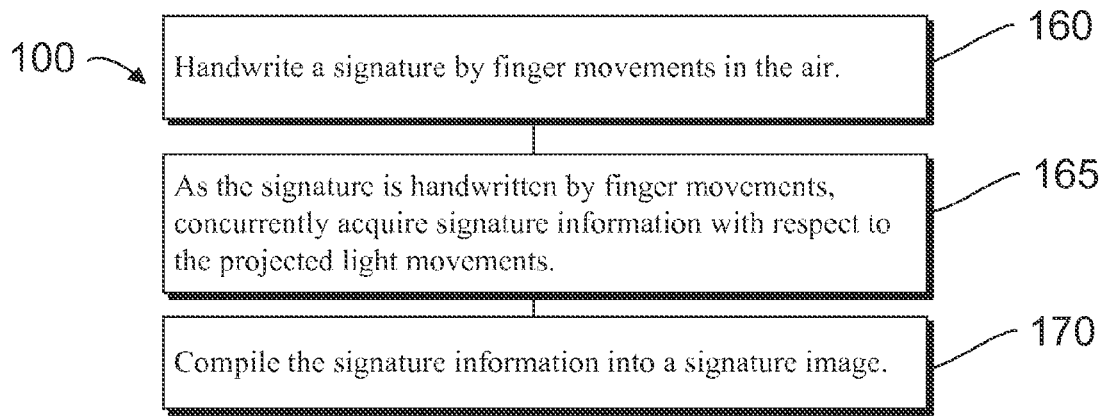
FIG. 4 is a block diagram depicting an exemplary method according to the present invention wherein a signature is handwritten by finger movements in the air.

Referring now to FIG. 4, in an alternative embodiment of the method according to the present invention, the signing person handwrites a signature by moving his or her finger(s) in the air (e.g., in the free space proximate to the person) 160. Typically, the signing person faces the camera and positions his or her hand at approximately the height of his or her head. The signing person extends a finger(s) toward the camera and, while maintaining his or her hand in a position that is within the camera's field of view, executes a signature motion using finger and/or hand gestures. Using this technique facilitates the image-processing device's task of distinguishing the end of the signing person's finger from other objects in the background of each image frame captured by the camera. This task may further be facilitated by placing a distinctive covering on the signing person's finger and/or hand. For example, the tip of the signing person's finger may be covered with a thimble-like covering, which covering may have a distinctive color such as bright orange. By way of further example, the signing person may wear a glove having a uniform and distinctive color with respect to typical background objects.

While the signing person is handwriting his or her signature using finger movements, signature information with respect to the finger movements is concurrently acquired 165. The signature information may be positional information of the finger movements (e.g. the location of the fingertip within each image frame), or it may be signature-information images of the finger movements. The signature information is compiled into a signature image 170.

To supplement the present disclosure, this application incorporates entirely by reference the following patents, patent application publications, and patent applications: U.S. Pat. Nos. 6,832,725; 7,159,783; 7,128,266; 7,413,127; 7,726,575; 8,390,909; 8,294,969; 8,408,469; 8,408,468; 8,381,979; 8,408,464; 8,317,105; 8,366,005; 8,424,768; 8,322,622; 8,371,507; 8,376,233; 8,457,013; 8,448,863; 8,459,557; 8,469,272; 8,474,712; 8,479,992; 8,490,877; 8,517,271; 8,523,076; 8,528,819; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. Patent Application Publication No. 2013/0175343; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/432,197 for a Laser Scanning System Using Laser Beam Sources For Producing Long And Short Wavelengths In Combination With Beam-Waist Extending Optics To Extend The Depth Of Field Thereof While Resolving High Resolution Bar Code Symbols Having Minimum Code Element Widths, filed Mar. 28, 2012 (Havens et al.); U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein);

U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); and U.S. patent application Ser. No. 14/019,616 for a Device Having Light Source to Reduce Surface Pathogens, filed Sep. 6, 2013 (Todeschini).

\* \* \*

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for acquiring a person's signature, comprising:
concurrently acquiring signature information with respect to light movements projected in a signature motion sequence with an image-processing device; and
wherein the step of concurrently acquiring signature information with respect to the projected light movements comprises (i) capturing substantially all of the projected light movements in an overexposed signature-information image at selected time intervals, and (ii) compiling the overexposed signature-information images into a signature image that shows the position of the light movements at substantially every interval of time in the signature motion sequence.

2. The method according to claim 1, wherein the step of acquiring signature information with respect to the projected light movements comprises capturing positional information of the projected light movements.

3. The method according to claim 1, comprising the step of concurrently analyzing the signature information during the step of acquiring signature information.

4. The method according to claim 1, comprising the step of concurrently displaying the signature information during the step of compiling the signature information into a signature image.

5. The method according to claim 1, comprising the step of displaying the compiled signature image.

6. The method according to claim 1, comprising the step of recording the compiled signature image.

7. The method according to claim 1, comprising the step of acquiring an image of the signing person's face.

8. A method for capturing signature information, comprising:
providing an image-processing device that includes (i) a camera for capturing signature information within the camera's field of view, (ii) a display for displaying signature information captured by the camera, and (iii) a computer processor communicatively connected to the camera and the display;

as a signature is handwritten on a surface in a signature motion sequence using a light-emitting device, concurrently capturing signature information with respect to projected light using the image-processing device's camera;

displaying the compiled signature image using the image-processing device's display;

wherein the step of concurrently acquiring signature information with respect to the projected light comprises (i) capturing substantially all of the projected light movements in an overexposed signature-information image at selected time intervals, and (ii) compiling the overexposed signature-information images into a signature image that shows the position of the light movements at substantially every interval of time in the signature motion sequence.

9. The method according to claim 8, wherein the step of capturing signature information with respect to the projected light comprises capturing positional information of the projected light using the image-processing device's camera.

10. The method according to claim 8, comprising the step of concurrently displaying the signature information using the image-processing device's display during the step of capturing the signature information.

11. The method according to claim 8, wherein the computer processor includes an associated memory for storing the signature information and/or the compiled signature image.

12. A method for capturing signature information, comprising:

providing an image-processing device that includes (i) a camera for capturing signature information within the camera's field of view, (ii) a display for displaying signature information captured by the camera, and (iii) a computer processor communicatively connected to the camera and the display;

concurrently capturing signature information with respect to light projected, using a light-emitting device, at the image-processing device's camera in a signature motion sequence using the image-processing device's camera; and displaying the compiled signature image using the image-processing device's display;

wherein the step of concurrently acquiring signature information with respect to the projected light comprises (i) capturing substantially all of the projected light movements in an overexposed signature-information image at selected time intervals, and (ii) compiling the overexposed signature-information images into a signature image that shows the position of the light movements at substantially every interval of time in the signature motion sequence.

13. The method according to claim 12, wherein the step of capturing signature information with respect to the projected light comprises capturing positional information of the projected light using the image-processing device's camera.

14. The method according to claim 12, comprising the step of concurrently displaying the signature information using the image-processing device's display during the step of capturing the signature information.

15. The method according to claim 12, comprising the step of acquiring a facial image of the handwritten-signature's signee using the image-processing device's camera.

16. The method according to claim 12, wherein the computer processor includes an associated memory for storing the signature information and/or the compiled signature image.

17. A method for acquiring a person's signature, comprising:

concurrently acquiring signature information with respect to finger movements handwritten in the air in a signature motion sequence with an image-processing device; and wherein the step of concurrently acquiring signature information with respect to the finger movements comprises (i) capturing substantially all of the finger movements in an overexposed signature-information image at selected time intervals, and (ii) compiling the overexposed signature-information images into a signature image that shows the position of the finger movements at substantially every interval of time in the signature motion sequence.

18. The method according to claim 17, wherein the step of acquiring signature information with respect to the finger movements comprises capturing positional information of the finger movements.

19. The method according to claim 17, comprising the step of concurrently analyzing the signature information during the step of acquiring signature information.

20. The method according to claim 17, comprising the step of concurrently displaying the signature information during the step of compiling the signature information into a signature image.

21. The method according to claim 17, comprising the step of displaying the compiled signature image.

22. The method according to claim 17, comprising the step of recording the compiled signature image.

23. The method according to claim 17, comprising the step of acquiring an image of the signing person's face.

24. A method for capturing signature information, comprising:

providing an image-processing device that includes (i) a camera for capturing signature information within the camera's field of view, (ii) a display for displaying signature information captured by the camera, and (iii) a computer processor communicatively connected to the camera and the display;

as a signature is handwritten in a signature motion sequence within the field of view of the image processing device's camera, concurrently capturing signature information using the image-processing device's camera; and displaying the compiled signature image using the image-processing device's display;

wherein the step of concurrently acquiring signature information with respect to the projected light comprises (i) capturing substantially all of the signature motion in an overexposed signature-information image at selected time intervals, and (ii) compiling the overexposed signature-information images into a signature image that shows the position of the signature motion at substantially every interval of time in the signature motion sequence.

25. The method according to claim 24, wherein the step of capturing signature information comprises capturing hand-positioning information using the image-processing device's camera.

26. The method according to claim 24, wherein the step of capturing signature information comprises capturing signature-information images using the image-processing device's camera.

27. The method according to claim 24, comprising the step of concurrently displaying the signature information using the image-processing device's display during the step of capturing the signature information.

28. The method according to claim 24, comprising the step of acquiring a facial image of the handwritten-signature's signee using the image-processing device's camera.

29. The method according to claim 24, wherein the computer processor includes an associated memory for storing the signature information and/or the compiled signature image.

* * * * *